(12) United States Patent
Galley et al.

(10) Patent No.: US 7,874,207 B2
(45) Date of Patent: Jan. 25, 2011

(54) FLUID FLOW DIRECTION DETECTION

(75) Inventors: Thomas Center Galley, Sedalia, CO (US); Arnell Jean Galley, Sedalia, CO (US); Harbinder S. Pordal, Mason, OH (US); James F. Yoder, Blanchester, OH (US)

(73) Assignee: Intrinsic Minds, LLC, Sedalia, CO (US)

( * ) Notice: Subject to any disclaimer, the term of this patent is extended or adjusted under 35 U.S.C. 154(b) by 79 days.

(21) Appl. No.: 12/362,134

(22) Filed: Jan. 29, 2009

(65) Prior Publication Data

US 2010/0186496 A1 Jul. 29, 2010

(51) Int. Cl.
*G01W 1/00* (2006.01)
(52) U.S. Cl. .................................... 73/170.06
(58) Field of Classification Search .......... None
See application file for complete search history.

(56) References Cited

U.S. PATENT DOCUMENTS

| | | | |
|---|---|---|---|
| 3,995,480 A | 12/1976 | Edgerton | |
| 4,373,386 A | 2/1983 | Schuddemat et al. | |
| 4,391,137 A | 7/1983 | Kerfoot et al. | |
| 4,986,122 A | 1/1991 | Gust | |
| 5,014,553 A | 5/1991 | Hori et al. | |
| 5,645,348 A | 7/1997 | Stulen et al. | |
| 6,547,435 B1 | 4/2003 | Grosswig et al. | |
| 6,631,638 B2 | 10/2003 | James et al. | |

*Primary Examiner*—Andre J Allen
(74) *Attorney, Agent, or Firm*—Hensley Kim & Holzer, LLC

(57) ABSTRACT

In order to provide a robust, weather resistant, portable, low-noise, relatively inexpensive, wind direction detection device, disclosed herein is a method and device for detecting fluid flow direction based on sensing a temperature variation transmitted from a temperature variation source to one or more temperature sensors. One or more indicators are utilized to communicate the measured fluid flow direction to a user. An implementation of the fluid flow direction detection device utilizes a resistance heater as the temperature variation source, thermistors as the temperature sensors, and light emitting diodes (LEDs) corresponding to each thermistor as the indicators. The thermistors and LEDs are arranged in a circular fashion around the resistance heater to accurately detect the direction of a thermal plume generated by the resistance heater.

30 Claims, 15 Drawing Sheets

FLUID FLOW DIRECTION DETECTION

BACKGROUND

Hunters, golfers, and other outdoor enthusiasts frequently desire to determine real-time wind direction, even when the magnitude of the wind is so slight that the outdoor enthusiast can not directly sense the wind on his or her person. For example, a failure to know even the slightest wind direction has been a constant challenge for hunters of large game, because the hunter may find himself or herself upwind from the hunted animal, thereby alerting the hunted animal to the hunter's presence. Further, hunters of waterfowl generally desire to set their decoys or hunt downwind of the waterfowl, even if the wind is imperceptible by the hunter, because birds generally land into the wind. Moreover, real-time knowledge of the wind direction is useful to golfers in selecting the correct golf club and aligning their stance to achieve the desired targeting on a shot. Knowledge of wind direction is also desirable in other recreational sports such as hiking, archery, badminton, and other outdoor activities that are affected by the wind direction. Detecting wind direction or the flow of other fluids has non-recreational applications as well, including emergency management of chemical spills, fire fighting, etc.

Various devices, systems, and methods exist for detecting wind direction. Such devices range in complexity from simple mechanical weather vanes to complex weather stations that precisely measure both wind direction and speed. However, the usefulness of these devices to an outdoor enthusiast is often limited by their size, weight, cost, lack of portability, and ability to detect wind with a very small magnitude. These devices may also be limited in use under low light conditions.

Many simple methods for measuring wind direction also exist in the art. For example, an outdoor enthusiast may throw a handful of grass, dirt, or other lightweight material in to the air and watch the direction the material moves to determine wind direction. However, in the case of a hunter, the sudden movement of the hunter as well as the sudden appearance of a cloud of dark material could be detected by the hunted animal. Chemical smoke or powder dispensers are also known in the art to provide an indication of wind direction. However, under some circumstances, particularly if the hunter is already positioned partially upwind from the hunted animal, the chemical odor may be detected by the animal. Further, such methods are not particularly effective in low light situations, where the outdoor enthusiast cannot adequately see the grass, dirt, or chemical.

Other methods, such as wetting the outdoor enthusiast's finger and monitoring which side of the finger cools and/or dries first, may not offer adequate information when the magnitude of the wind is slight or the temperature is too cold to feel cooling and/or drying on a particular side of the outdoor enthusiast's finger. Similarly, a piece of hanging string or thread may be too heavy to move in the direction of a slight wind. Moreover, the piece of hanging string or thread may also be difficult to see in low light conditions.

SUMMARY

Disclosed herein is a method and device for detecting fluid flow direction based on sensing a temperature variation in a fluid flowing past a temperature variation source to one or more temperature sensors. One or more indicators are utilized to communicate the measured fluid flow direction to a user. An implementation of the fluid flow direction detection device utilizes a resistance heater as the temperature variation source, thermistors as the temperature sensors, and light emitting diodes (LEDs) as the indicators. The thermistors and LEDs may be arranged in a circular fashion around the resistance heater to accurately detect the direction of a thermal plume generated by the resistance heater, although other thermistor and LED configurations are also contemplated.

One implementation of the fluid flow direction detection device incorporates a cylindrical housing for batteries, a detector circuit, and related electrical connections. The housing has a switch operable to power the temperature variation source, temperature sensors, and/or the indicator(s). The housing may be weather resistant.

Another implementation of the fluid flow direction detection device incorporates a protective cover that remains in place when the fluid flow direction detection device is in use. The protective cover can protect the temperature variation source, temperature sensors, and/or the indicator(s) from damage caused by physical impact.

Yet another implementation of the fluid flow direction detection device incorporates a removable protective cap that protects the temperature variation source, temperature sensors, and/or the indicator(s) of the fluid flow direction detection device while the fluid flow direction detection device is in storage. The protective cap may also be weather-resistant. Yet another implementation of the fluid flow direction detection device incorporates a protective container that encompasses the fluid flow direction detection device while it is in storage. The protective container may also be weather-resistant.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

BRIEF DESCRIPTION OF THE DRAWINGS

The described technology is best understood from the following Detailed Description describing various implementations read in connection with the accompanying drawings.

DETAILED DESCRIPTIONS

Hunters, golfers, and other outdoor enthusiasts would find useful a robust, weather resistant (e.g. splash-proof, water-resistant, waterproof, or air-tight), portable, low-noise, relatively inexpensive, wind direction detection device that offers reasonable accuracy even when the magnitude of the wind is so slight that the outdoor enthusiast can not directly sense the wind on his or her person. Disclosed herein is a method and device for detecting wind based on sensing a temperature variation of a fluid flowing past a temperature variation source to one or more temperature sensors.

Figure 1:
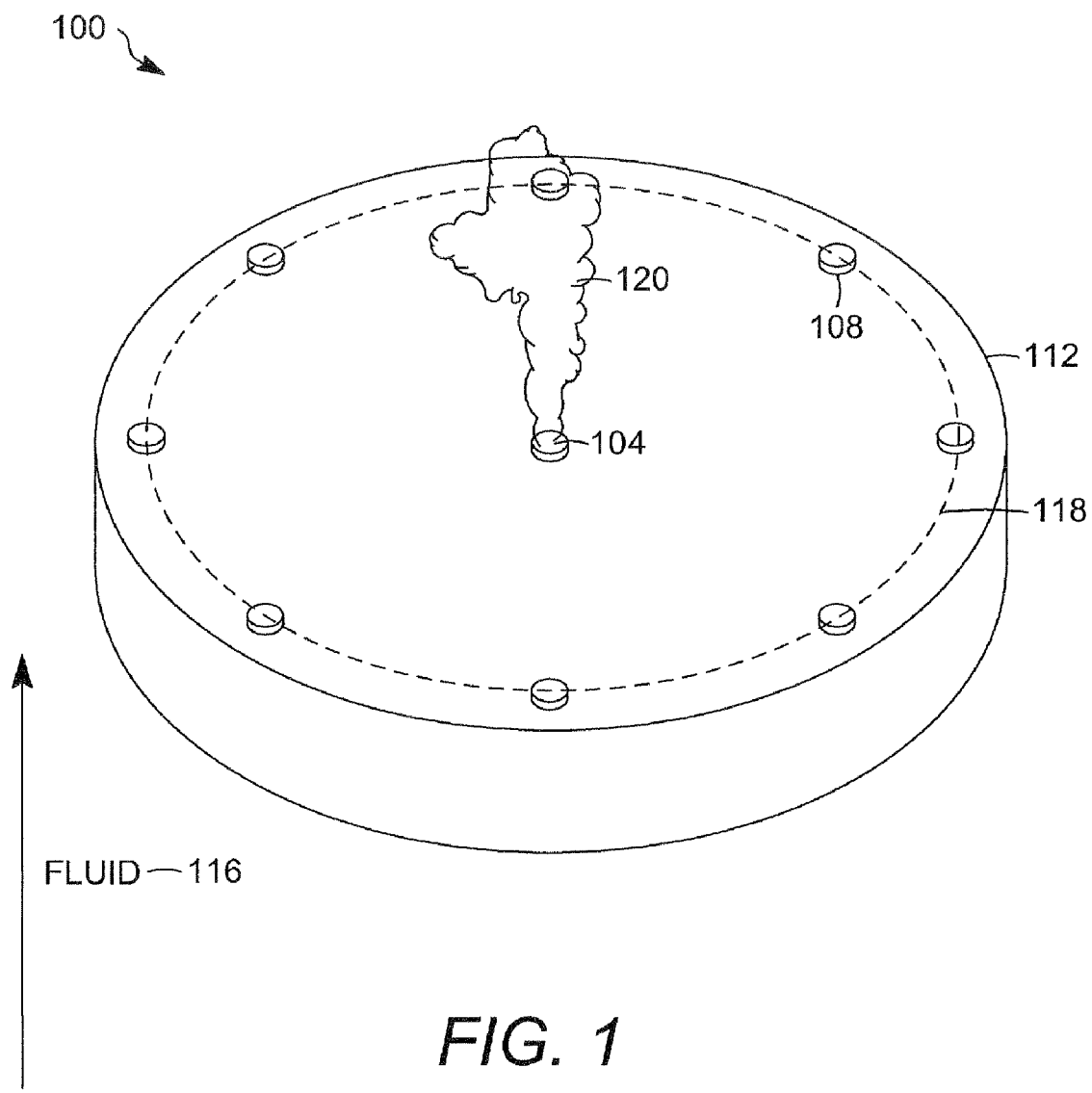
FIG. 1 schematically illustrates a component of an example fluid flow direction detection device with a centrally located temperature variation source and temperature sensors surrounding the temperature variation source.

FIG. 1 schematically illustrates a component 100 of an example fluid flow direction detection device with a centrally located temperature variation source 104 and temperature sensors 108 surrounding the temperature variation source 104. More specifically, the temperature variation source 104 is surrounded by eight temperature sensors 108 mounted on a substantially common plane 112 oriented substantially parallel to a fluid flow 116. The temperature variation source 104 emits a temperature variation plume 120 (e.g., a three-dimensional region of relative heating or cooling), which enters the fluid flow 116 and alters its temperature. For example, if the temperature variation source 104 is a heat source, the temperature variation plume 120 increases the temperature of the fluid flow 116 that is detected by the temperature sensors 108 in the direction of the fluid flow 116. If the temperature variation source 104 is a heat sink, the temperature variation plume 120 decreases the temperature of the fluid flow 116 that is detected by the temperature sensors 108 in the direction of the fluid flow 116. In either configuration, the temperature differential detected by the temperature sensors 108 may be used to determine the direction of the fluid flow 116.

The fluid flow 116 may consist of any gaseous or liquid fluid, for example, air or water. In an alternative implementation, the fluid flow 116 may consist of plasma. The temperature variation source 104 may add (e.g., as a heat source) or remove (e.g., as a heat sink) thermal energy from the fluid flow 116. More specifically, the temperature variation source 104 may be any compact source of thermal energy, such as a chemical reaction (e.g. burning), electromagnetic dissipation (e.g. electric resistance), or any other heat source. Alternatively, the temperature variation source 104 may be any compact sink of thermal energy, such as a discharge of a compressed fluid cartridge (e.g. Air, Nitrogen Dioxide, and Carbon Dioxide), discharge of a refrigerated fluid, a surface cooled to a lower temperature than the fluid flow or the ambient air, or any other heat sink. The temperature sensors 108 may incorporate any compact structure for measuring temperature, such as a thermometer, thermistor, thermocouple, or a band-gap temperature sensor.

In an implementation described with specificity below, the temperature variation source 104 is a surface mount 100 Ohm metal film resistor with a 0805 case size and a 0.1 watt power rating. In an alternative implementation, the temperature variation source 104 is a surface mount 18 Ohm carbon film resistor with a 0603 case size and a 0.0625 watt power rating. Other temperature variation sources may be employed. Further, the temperature sensors 108 in the implementation described with specificity below are negative temperature coefficient thermistors with a 10 kilo ohm resistance at 25° C., β constant of 3435K or higher, and a case size of 0603, although other temperature sensor devices may be employed. Each resistor and the thermistor have a trace width of 0.025 inches +/−0.02 inches.

In various implementations, any number of temperature sensors 108 may be used to determine fluid flow direction. For example, in an implementation where only one temperature sensor 108 is utilized to detect fluid flow direction, the fluid flow direction detection device may indicate whether or not the fluid flow 116 is in the direction of the single temperature sensor 108. In such a configuration, the measurements taken by the single temperature sensor 108 can be monitored by the fluid flow direction detection device over time. As the user rotates the fluid flow direction detection device, the single temperature sensor 108 will detect a temporal change in temperature as the temperature variation source 104 moves upwind of the single temperature sensor 108. Therefore, by monitoring for temporal changes detected by the sensor as the fluid flow direction detection device is rotated, the device can determine when the temperature variation source 104 is aligned with the single temperature sensor 108 in the direction of fluid flow and thereby determine the direction of the fluid flow.

A fluid flow direction detection device having multiple temperature sensors 108 can detect fluid flow in more than one direction when stationary (e.g., without using rotation of the device itself). For example, a fluid flow direction detection device having eight temperature sensors 108 arrayed in a circle 118 about the temperature variation source 104 (as shown in FIG. 1) can detect fluid flow direction in 360° about the temperature variation source 104 (although a greater or lesser number of temperatures sensors may be used). In one implementation, the temperature measurements of the multiple temperature sensors 108 are processed in combination to determine the direction of fluid flow. For example, a temperature sensor 108 detecting the relative maximum temperature from a heated fluid flow can correspond to the direction of fluid flow, although other computations may be employed. As such, the fluid flow direction detection may be based on the temperature sensor 108 with the greatest temperature differential when compared with one or more other temperature sensors 108.

In addition, the more temperature sensors 108 located in the circle 118, the greater the precision of the fluid flow direction detection. For example, the fluid flow direction detection device can interpolate readings between two adjacent temperature sensors 108 and determine that the direction of fluid flow at an angle between the two temperature sensors 108. In yet another implementation, where the temperature sensors 108 are arranged such that more than one temperature sensor 108 detects a temperature change, the temperature sensor 108 located in the middle of a group of temperature sensors 108 indicating a change in temperature may be selected as indicating the fluid flow direction. Various smoothing filters and noise reduction filters may be applied to the measurements before computing the fluid flow direction.

In another implementation, temporal measurements may be used to detect the direction of fluid flow in configurations employing multiple sensors. When multiple temperature sensors 108 detect a temperature change over time, the temperature sensor measuring the greatest change over a predefined time period may be selected as indicating the fluid flow direction.

Temporal parameters may also be used to filter noise from the temperature measurements. For example, extremes of measurements taking in a predetermined time period may be disregarded to filter out anomalous readings (e.g., gusting and/or swirling wind). In an alternative implementation, a smoothing filter may be applied to measurements taken during a predefined time period to reduce measurement and environmental (e.g., gusts and swirls) noise.

While the implementation of FIG. 1 shows the temperature sensors 108 located equidistant from each other and from the temperature variation source 104, alternate implementations may incorporate temperature sensors 108 located varying distances from the temperature variation source 104 and/or varying distances from one another.

Further, while the temperature variation source 104 and the temperature sensors 108 are shown in FIG. 1 mounted on a common plane 112, alternate implementations may incorporate temperature sensors 108 mounted on a plane parallel, but above or below the plane upon which the temperature variation source 104 is mounted. In an implementation where the temperature variation plume 120 is a heat plume and thus rises with respect to the fluid flow 116, the temperature sensors 108 may be mounted on a plane above the temperature variation source 104. Conversely, in an implementation where the temperature variation plume 120 is a heat sink and thus sinks with respect to the fluid flow 116, the temperature sensors 108 may be mounted on a plane below the temperature variation source 104.

Figure 2:
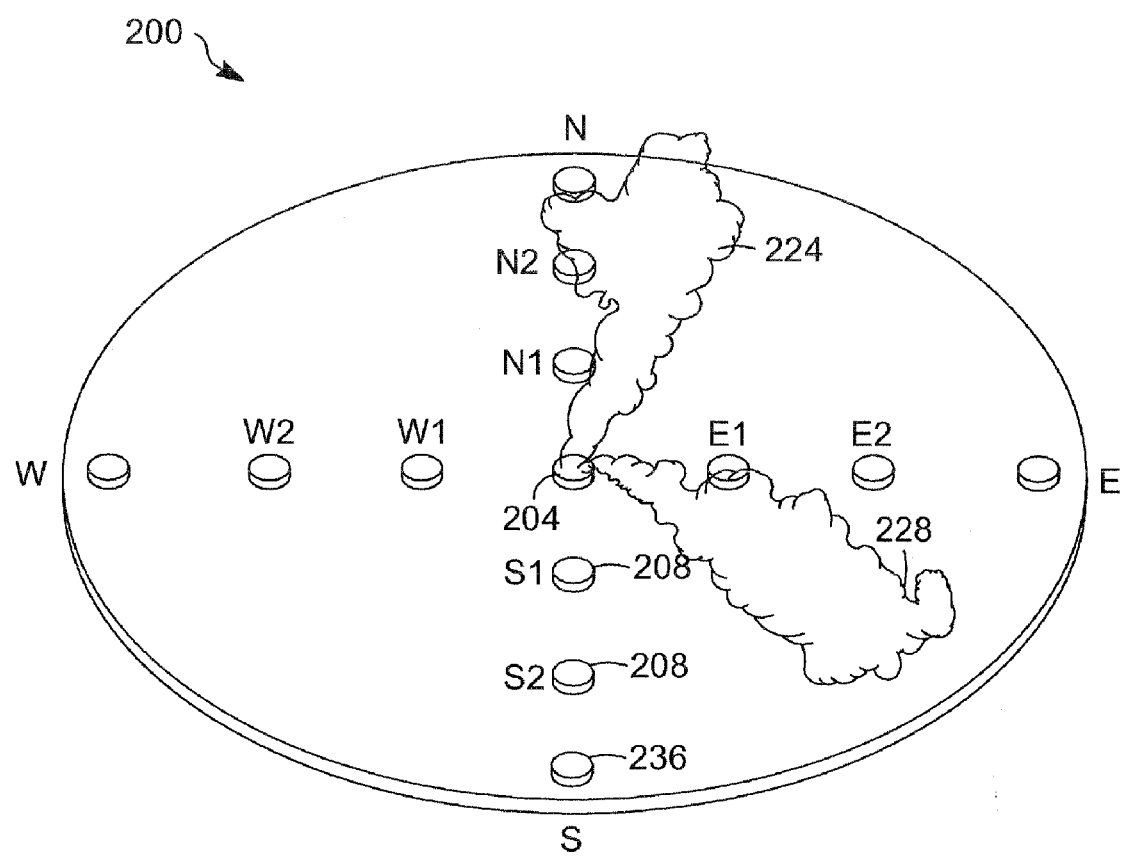
FIG. 2 schematically illustrates a component of another example fluid flow direction detection device with example temperature variation plumes extending from a temperature variation source.

FIG. 2 schematically illustrates a component 200 of another example fluid flow direction detection device with example temperature variation plumes 224 and 228 extending from a temperature variation source 204. In this fluid flow direction detection device, eight temperature sensors 208 surround the temperature variation source 204 at two different distances from the temperature variation source 204. Further, a pair of temperature sensors 208 is positioned at each of the cardinal directions, north, south, east, and west. Indicators 236 are also shown outside of the temperature sensors 208 positioned at each of the cardinal directions.

Example temperature variation plume 224 extends north-north-east from the temperature variation source 204 and indicates a south-south-west fluid flow since fluid flow is typically measured by reference to its origin. Example temperature variation plume 228 extends east-south-east from the temperature variation source 204, thus indicating a west-north-west fluid flow.

The fluid flow direction detection device of FIG. 2 includes temperature sensors 208 located at various distances and cardinal directions from the temperature variation source 204. With respect to example temperature variation plume 224, the temperature variation source 204 causes thermal energy to be transferred to or from a south-south-west fluid flow. As the thermal energy is transferred to or from the fluid flow, a temperature variation plume 224 is formed extending north-north-east from the temperature variation source 204. Temperature sensors 208 oriented in the north and east cardinal directions sense a temperature change. In an alternative implementation, the temperature sensors 208 oriented in the north and east cardinal directions detect a temperature differential when compared to temperature sensors 208 oriented in south and west cardinal directions. Either implementation indicates that the fluid flow direction is south-west.

Further, with respect to example temperature variation plume 224, the temperature sensors 208 oriented in the north cardinal direction detect a greater temperature change or temperature differential than the temperature sensors 208 oriented in the east cardinal direction. Therefore, the temperature variation plume 224 extends more north than east. The fluid flow direction for temperature variation plume 224 is therefore south-south-west.

With respect to example temperature variation plume 228, the temperature variation source 204 causes thermal energy to be transferred to or from a west-north-west fluid flow. As the thermal energy is transferred to or from the fluid flow, a temperature variation plume 228 is formed extending east-south-east from the temperature variation source 204. Temperature sensors 208 oriented in the south and east cardinal directions sense a temperature change. In an alternative implementation, the temperature sensors 208 oriented in the south and east cardinal directions detect a temperature differential when compared to temperature sensors 208 oriented in north and west cardinal directions. Either implementation indicates that the fluid flow direction is north-west.

Further, with respect to example temperature variation plume 228, the temperature sensors 208 oriented in the east cardinal direction detect a greater temperature change or temperature differential than the temperature sensors 208 oriented in the south cardinal direction. Therefore, the temperature variation plume 224 extends more east than south. The fluid flow direction for temperature variation plume 224 is therefore west-north-west.

A fluid flow direction detection device has been tested for technical feasibility. The technical feasibility was assessed by testing the ability of the test device to detect wind at various speeds. For low wind speeds (0.1-0.33 miles per hour (mph)), the test environment was a fan placed such that airflow was drawn over the test device and into the fan. For higher wind speeds (0.33-6.2 miles per hour (mph)), the test environment was a four-sided channel with the test device placed within the channel. Fans drew air over the test device through the channel. All of the tests of the test device were conducted with respect to a known wind speed measured by a hot wire anemometer.

The test device has temperature sensors 208 oriented as per the fluid flow direction detection device of FIG. 2. More specifically, the test device has four temperature sensors 208 located 0.25 inches from the temperature variation source 204 (N1, S1, E1, and W1) and four temperature sensors 208 located 0.5 inches from the temperature variation source (N2, S2, E2, and W2). The temperature sensors 208 are located at arbitrary cardinal directions north, south, east, and west. The test device utilizes detector circuitry on a printed circuit board with a diameter of 3 inches, larger than what is expected to be necessary for accurate wind direction measurements.

In one implementation, a fluid flow detection device contains detector circuitry that controls the temperature variation source 204, monitors the temperature at the temperature sensors 208, and controls indicators 236 visually displaying fluid flow direction. In addition, the fluid flow detection device may include storage, such as memory, in which program code and data may be stored for operation. LED's may be used as indicators 236 visually displaying the fluid flow direction, although other indicators may be used, including mechanical indicators, an LCD readout, etc. The number and/or location of the indicators 236 may correspond to the number and/or location of the temperature sensors 208, although in other implementations, the number and/or location of the indicators 236 may differ from the number and/or location of the temperature sensors 208. It should be noted that the corresponding indicators 236 and temperature sensors 208 may be located on opposite sides of the temperature variation source 204.

An example detection process maybe triggered by providing power to the fluid flow detection device (e.g., a battery or other power source triggered by an on/off switch). Upon activation, all LEDs flash for one second (e.g., to identify inoperable LEDs, if any). In the first five seconds, all of the temperature sensors sample twenty times per second. Any temperature sensor that has measured greater than 50% of the median temperature variation by all of the temperature sensors powers a corresponding or designated LED in a flashing mode after the initial five second period. After another two seconds, the flashing LED or LEDs corresponding to the temperature sensor measuring the greatest temperature change (e.g., the hottest sensor, the coolest sensor) or, alternatively, the flashing LED or LEDs corresponding to a location computed by the monitor circuitry to correspond to the direction of fluid flow, are powered in a solid mode. If the multiple temperature sensors measure substantially the same temperature or temperature change (e.g., within a threshold), then each of the corresponding LEDs may be powered in a solid mode. If such multiple temperature sensors are determined to be nonadjacent, all LEDs may be powered in a flashing mode to indicate an inaccurate or inconsistent reading. Adjacency may be determined by assigning an index to each temperature sensor and discerning when the indices of these temperature sensors are not adjacent.

In another example detection process, all of the temperature sensors sample twenty times per second for 10-12 seconds before powering any LEDs that measure greater than 50% of the median temperature variation by all of the temperature sensors. Increasing an initial sampling period from 5 seconds to 10-12 seconds increases the accuracy of the example detection process. However, increasing the initial sampling period also increases the overall temperature of the detector circuitry, which can lead to decreased accuracy if the increased temperature is not uniform throughout the detector circuitry.

In one implementation, the temperature sensor(s) and/or the temperature variation source are exposed to the atmosphere, which can enhance the accuracy and sensitivity of the device. In another implementation, one or more of the temperature sensor(s) and/or temperature variation source may be covered with a thin conformal coating material to protect from corrosion and other damage. The coating material may be any dielectric or insulating material and may be applied by various methods including brushing, spraying, and dipping. Furthermore, in one implementation, the temperature sensors are passive (i.e., unheated or uncooled), such that they respond primarily from temperature variation provided by the temperature variation source and the fluid flow.

Test data graphs shown in FIGS. 3-10 exhibit normalized resistance values (R) measured from two selected temperature sensors oriented 90° from one another as a function of wind angle. The test wind angles are five points equally spaced over the 90° span corresponding to the two selected temperature sensors. A lower R value indicates that the temperature sensor absorbs more energy from a thermal plume emitted from the temperature variation source, here, a resistance heater.

Figure 3:
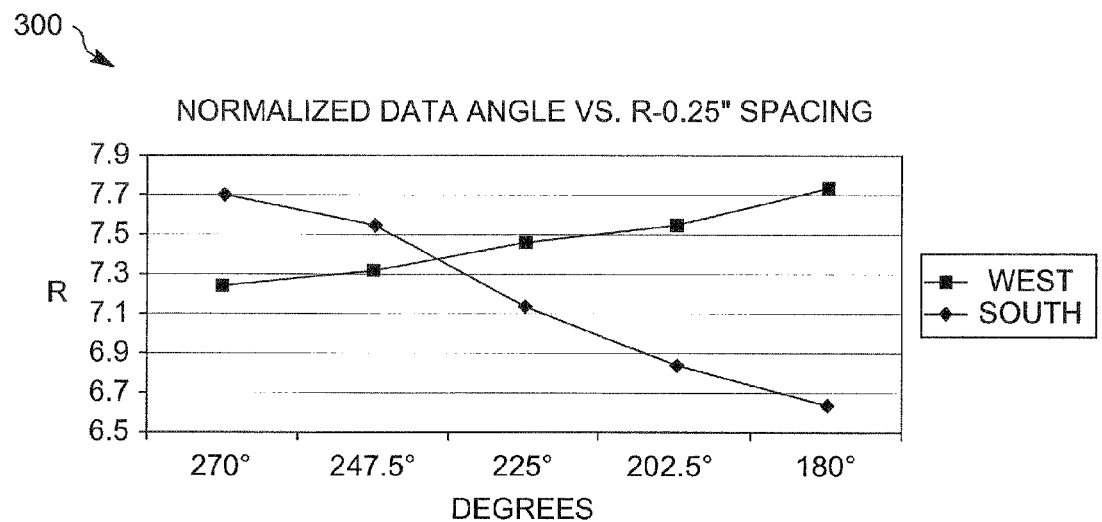
FIG. 3 shows an example test data graph depicting test data recorded utilizing a low-speed test environment with a wind speed of approximately 0.33 mph utilizing sensors located 0.25 inches from the temperature variation source.

FIG. 3 shows an example test data graph 300 depicting test data recorded utilizing a low-speed test environment with a wind speed of approximately 0.33 mph utilizing sensors located 0.25 inches from the temperature variation source (W1 and S1). The test wind angles were five points ranging from an east wind to a north wind (270°, 247.5°, 225°, 202.5°, and 180°). The test data for the test device of FIG. 3 shows that the crossover point for the R values of W1 and S1 is skewed from the center of the data graph where the R values of S1 and W1 should be equal (i.e. 225°).

Figure 4:
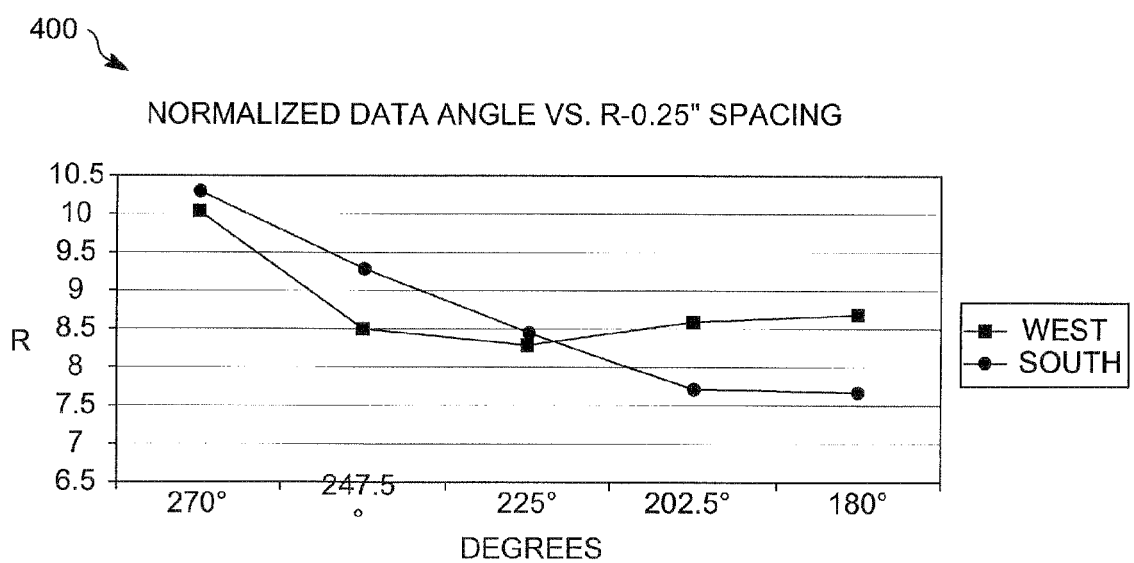
FIG. 4 shows another example test data graph depicting test data recorded utilizing a low-speed test environment with a wind speed of approximately 0.33 mph utilizing sensors located 0.25 inches from the temperature variation source.

FIG. 4 shows another example test data graph 400 depicting test data recorded utilizing a low-speed test environment with a wind speed of approximately 0.33 mph utilizing sensors located 0.25 inches from the temperature variation source (W1 and S1). The test wind angles were five points ranging from an east wind to a north wind (270°, 247.5°, 225°, 202.5°, and 180°). However, the test device of FIG. 4 incorporates pedestals (such as the pedestals 1156 of FIG. 11) but no protective cover (such as the protective cover 1132 of FIG. 11). The test data of FIG. 4 shows a greater degree of distortion in the R values when the pedestals are incorporated.

Figure 5:
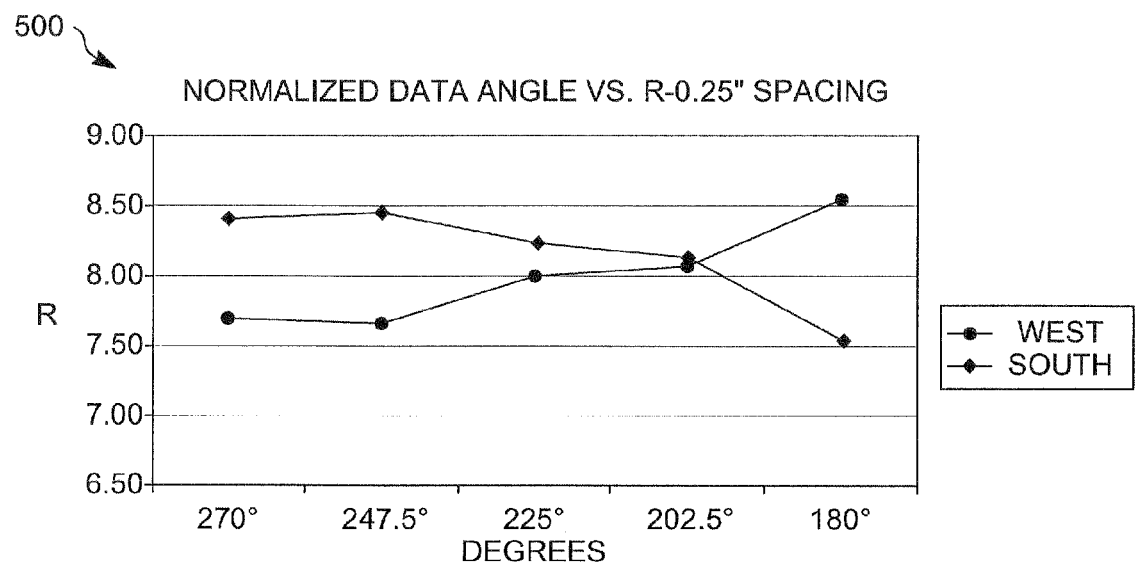
FIG. 5 shows yet another example test data graph depicting test data recorded utilizing a low-speed test environment with a wind speed of approximately 0.33 mph utilizing sensors located 0.25 inches from the temperature variation source.

FIG. 5 shows yet another example test data graph 500 depicting test data recorded utilizing a low-speed test environment with a wind speed of approximately 0.33 mph utilizing sensors located 0.25 inches from the temperature variation source (W1 and S1). The test wind angles were five points ranging from an east wind to a north wind (270°, 247.5°, 225°, 202.5°, and 180°). However, the test device of FIG. 5 incorporates pedestals and a protective cover. The test data of FIG. 5 still shows the crossover point for the R values of W1 and S1 skewed from the center of the data graph where the R values of S1 and W1 should be equal (i.e. 225°).

As a result, the test data presented in FIGS. 3-5 indicate that the temperature sensors W1 and S1 may operate better when positioned farther away from the temperature variation source. The wind flow is interrupted in the immediate area around the temperature variation source and normalizes as it continues to flow away from the temperature variation source. A distance of 0.25 inches is too small for the wind flow to normalize and thus leads to a skew in the data. Further, the pedestals and protective cover add additional interruption to the wind flow.

Figure 6:
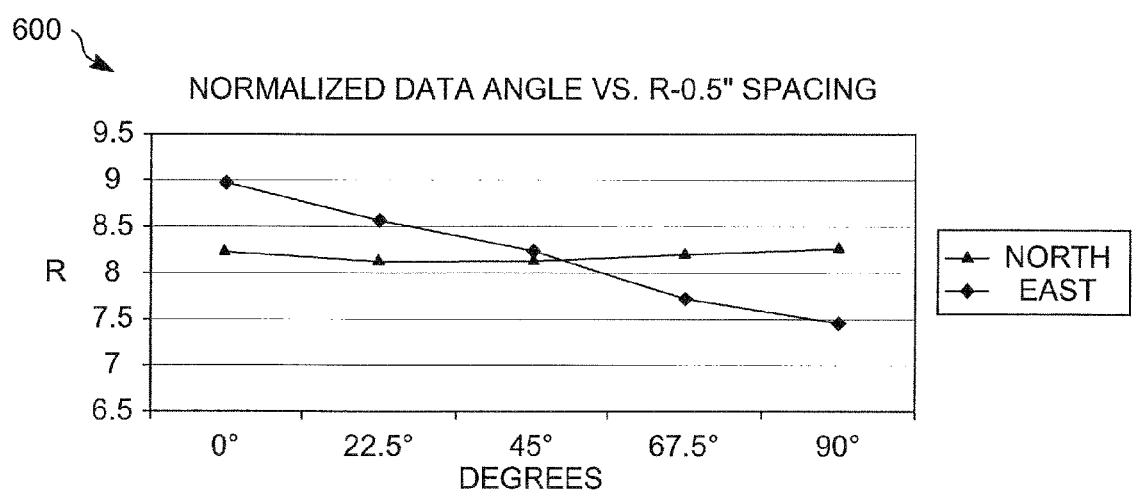
FIG. 6 shows an example test data graph depicting test data recorded utilizing a low-speed test environment with a wind speed of approximately 0.33 mph utilizing sensors located 0.5 inches from the temperature variation source.

FIG. 6 shows an example test data graph 600 depicting test data recorded utilizing a low-speed test environment with a wind speed of approximately 0.33 mph utilizing sensors located 0.5 inches from the temperature variation source (N2 and E2) without pedestals or a protective cover. The test wind angles were five points ranging from a south wind to a west wind (0°, 22.5°, 45°, 67.5°, and 90°). The test data of FIG. 6 shows a symmetric signal pattern with a relatively un-skewed crossover point near the center of the data graph where the R values of N2 and E2 should be equal (i.e. 45°).

Figure 7:
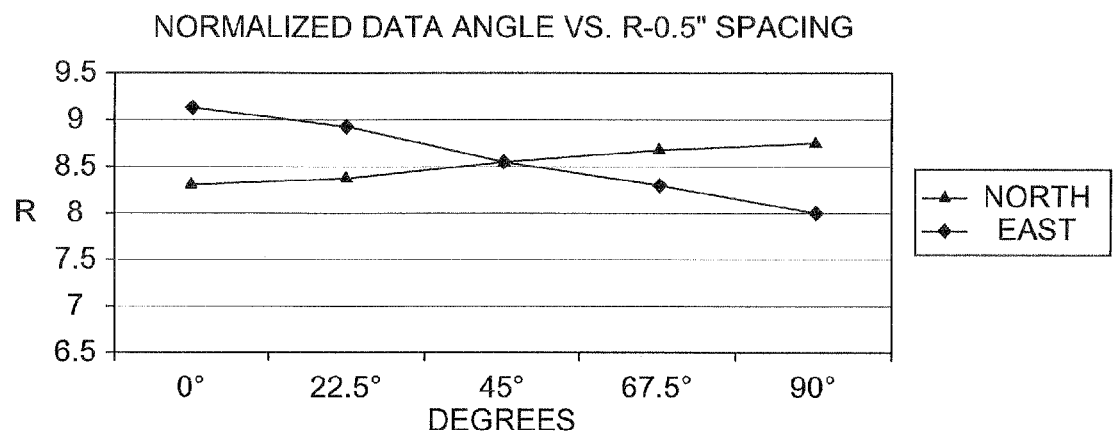
FIG. 7 shows another example test data graph depicting test data recorded utilizing a low-speed test environment with a wind speed of approximately 0.33 mph utilizing sensors located 0.5 inches from the temperature variation source.

FIG. 7 shows another example test data graph 700 depicting test data recorded utilizing a low-speed test environment with a wind speed of approximately 0.33 mph utilizing sensors located 0.5 inches from the temperature variation source (N2 and E2). The test wind angles were five points ranging from a south wind to a west wind (0°, 22.5°, 45°, 67.5°, and 90°). The test device of FIG. 7 incorporates pedestals but no protective cover. The signal pattern remains symmetric with a relatively un-skewed crossover point near the center of the data graph where the R values of N2 and E2 should be equal (i.e. 45°).

Figure 8:
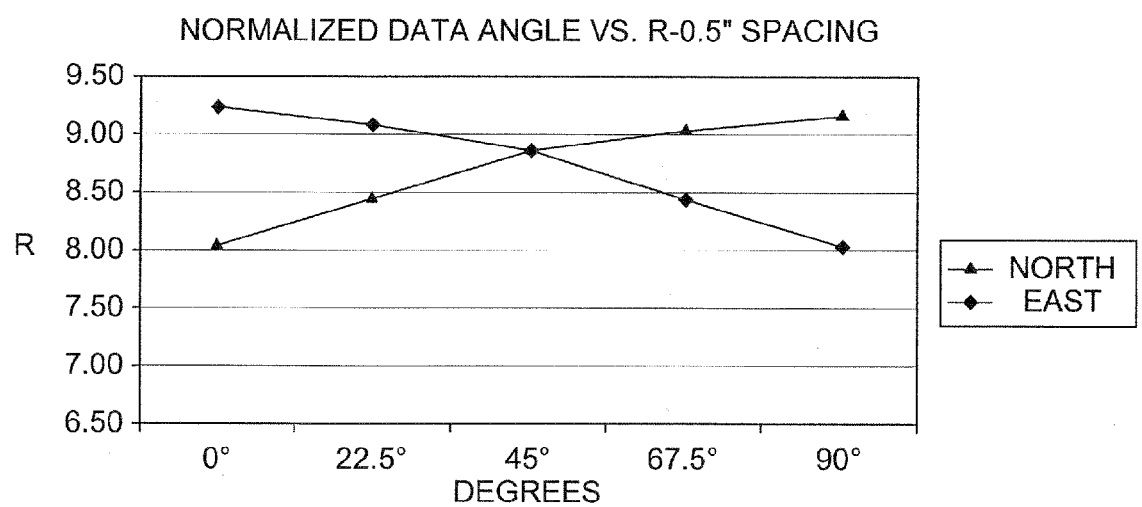
FIG. 8 shows yet another example test data graph depicting test data recorded utilizing a low-speed test environment with a wind speed of approximately 0.33 mph utilizing sensors located 0.5 inches from the temperature variation source.

FIG. 8 shows yet another example test data graph 800 depicting test data recorded utilizing a low-speed test environment with a wind speed of approximately 0.33 mph utilizing sensors located 0.5 inches from the temperature variation source (N2 and E2). The test wind angles were five points ranging from a south wind to a west wind (0°, 22.5°, 45°, 67.5°, and 90°). However, the test device of FIG. 8 incorporates both pedestals and a protective cover. The signal pattern remains symmetric with a relatively un-skewed cross-over point near the center of the data graph where the R values of N2 and E2 should be equal (i.e. 45°). The addition of the protective cover increases the amplitude of the signal. The heat plume from the temperature variation source is confined and more heat is forced over the sensors, thus increasing the range of R values measured.

The test data for spacing the temperature sensors 0.5 inches radially from the temperature variation source indicates that the relative positions of the temperature sensors and temperature variation source are not interfering with one another. Further, addition of the protective cover increases the amplitude of the temperature sensors signals. This configuration was tested using a high-speed test environment with wind speeds of approximately 1.5 mph, 2.2 mph, 3.3 mph, and 6.2 mph. The testing indicates that the signal remains symmetric at all wind speeds up to 6.2 mph.

Figure 9:
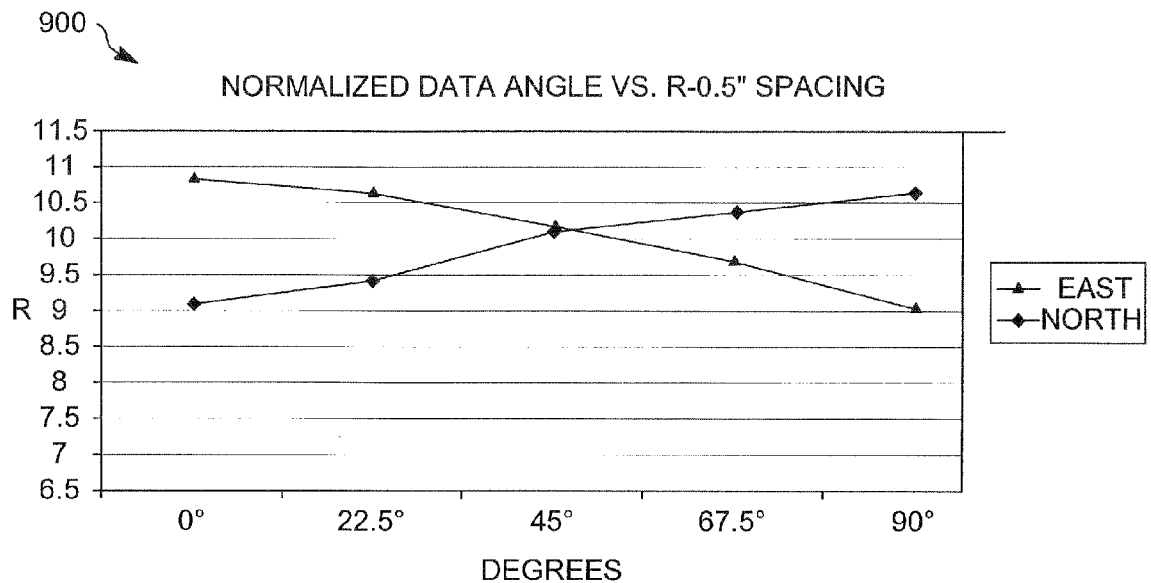
FIG. 9 shows an example test data graph depicting test data recorded utilizing a high-speed test environment with a wind speed of approximately 6.2 mph utilizing sensors located 0.5 inches from the temperature variation source.

FIG. 9 shows an example test data graph 900 depicting test data recorded utilizing a high-speed test environment with a wind speed of approximately 6.2 mph utilizing sensors located 0.5 inches from the temperature variation source (N2 and E2). The test wind angles are five points ranging from a south wind to a west wind (0°, 22.5°, 45°, 67.5°, and 90°). The fluid flow detection device of FIG. 9 incorporates both pedestals and a protective cover. The signal pattern remains symmetric with a relatively un-skewed cross-over point near the center of the data graph where the R values of N2 and E2 should be equal (i.e. 45°).

Since the test device is operable with reasonable accuracy with temperature sensors located 0.5 inches from the temperature variance source, the printed circuit board diameter for one implementation is set to 1.5 inches, and the pedestals are set out as far as possible and located in between the temperature sensors to minimize any airflow interruptions caused by the pedestals. In this arrangement, the edge of the fluid flow detection device is much closer to the temperature sensors than in the fluid flow detection devices of FIGS. 3-9.

Figure 10:
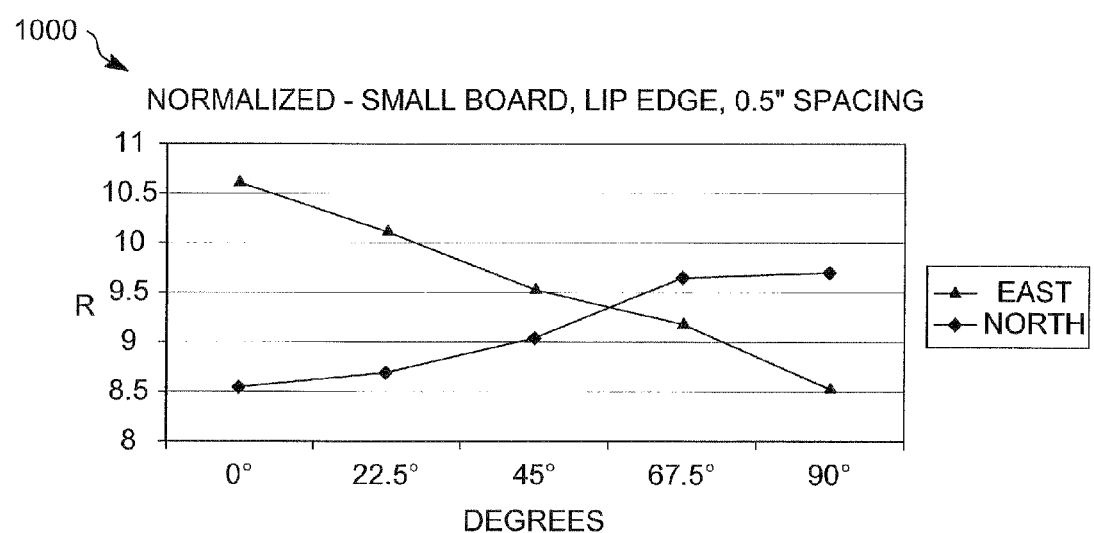
FIG. 10 shows an example test data graph 1000 depicting test data of a fluid flow detection device incorporating a lip.

FIG. 10 shows an example test data graph 1000 depicting test data of a fluid flow detection device incorporating a lip. Initial testing indicated a great deal of skewing of the signal pattern caused by flow perturbation generated by the edge of the fluid flow detection device. Accordingly, a lip was added to the fluid flow detection device of FIG. 10 to reduce the effect on the signal pattern caused by the proximity of the edge of the fluid flow detection device to the temperature sensors. While some skewing of the signal pattern is still observed, it is believed that wires extending from the temperature variation source may be perturbing the wind flow to some extent, thereby causing the remaining signal pattern skew.

The foregoing test data indicates that the test device is particularly suitable for very low wind speeds (i.e. wind speeds that cannot be physically detected by the user). A temperature sensor spacing of 0.5 inches from the temperature variation source provides sufficient signal amplitude and sensitivity to wind direction and placing a protective cover over the test device improves signal to noise ratio as well as provides physical protection to the temperature variation source and temperature sensors.

It was further observed during testing that a large portion of the heat generated by the temperature variation source was absorbed by the printed circuit board and conducted to the temperature sensors (more noticeable in the 0.25 inch temperature sensor spacing). However, the conduction of heat to the temperature sensors (e.g. component self-heating) does not appear to have an adverse effect on the test device's performance so long as the increased temperature is uniform across all the temperature sensors. However, the conduction of heat to the temperature sensors reduces the magnitude of the heat differential generated by the temperature variation source. An increase in the power applied to the temperature variation source (whether over time of operation or at all times) may increase the heat differential detected by the temperature sensors.

Cooling slots or heat sinks may be added to the printed circuit board between the temperature variation source and temperature sensors to minimize conduction of heat to the temperature sensors. However, the cooling slots may have negative effects, such as increasing the possibility of contaminants entering the interior of the test device and perturbing the wind flow around the temperature sensors.

To increase the heat generation of the temperature variation source, the use of a lower resistance heater (10 ohms versus 18 ohms) was examined. However, the lower resistance heater induced voltage transients that affected the accuracy of the test device. The 10 ohm resistance heater may be useable with a redesign of the test device detector circuitry.

Figure 11:
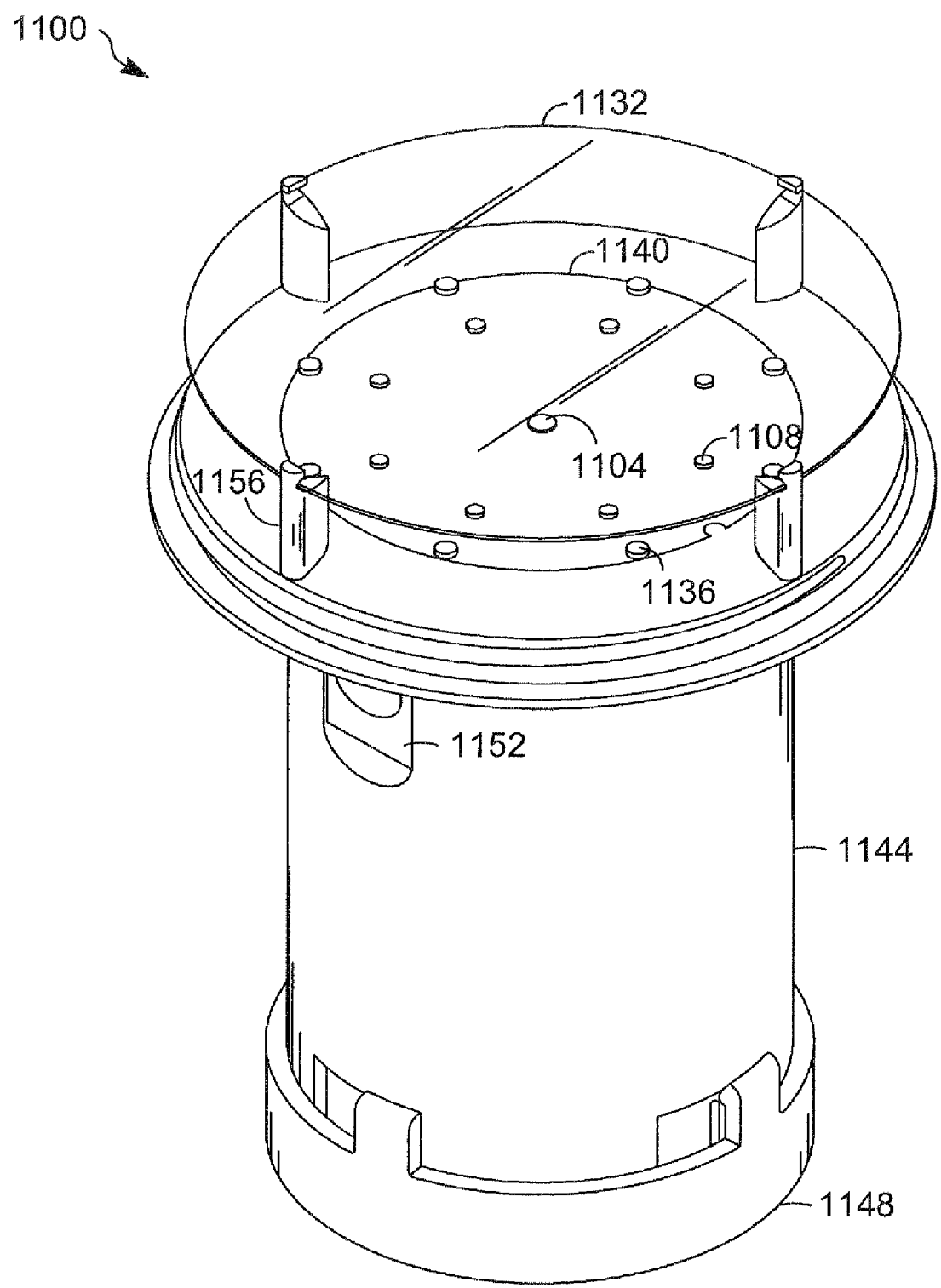
FIG. 11 illustrates a perspective view of an example fluid flow direction detection device with a protective cover.

FIG. 11 illustrates a perspective view of an example fluid flow direction detection device 1100 with a protective cover 1132. In this example implementation, a temperature variation source 1104, temperature sensors 1108, and indicators 1136 are positioned on a top side of a mounting board 1140. The bottom side of the mounting board 1140 is attached to a first end of a housing 1144. The housing 1144 is generally cylindrical with a first end adapted to accept the mounting board 1140. The housing 1144 may be constructed ABS plastic or any rigid or semi-rigid material (e.g. metal, other plastics, wood, and rubber). Further, the housing 1144 encompasses the internal components of the fluid flow direction detection device 1100 (e.g. batteries, fluid cartridges, and detector circuitry). In other implementations, the housing 1144 may have a configuration different than that shown in FIG. 11, while still adapted to accept the mounting board 1140 and encompassing the internal components of the fluid flow direction detection device 1100.

In the implementation of FIG. 11, a housing cap 1148 is attached to a second end of the housing 1144 of the fluid flow direction detection device 1100. The housing cap 1148 covers an open end of the housing 1144 either permanently sealing the housing 1144 or allowing selective access to the interior contents of the housing 1144. The housing cap 1148 may be constructed of the same material as the housing 1144 (e.g. ABS plastic) or any other rigid or semi-rigid material (e.g. metal, other plastics, wood, and rubber). Further, the housing cap 1148 may be attached to the housing 1144 using a variety of techniques (e.g. cam-action, screwing, crimping, welding, soldering, brazing, taping, gluing, press-fitting, or the use of various fasteners such as screws and clips). Selection of the attachment of the housing cap 1148 to the housing 1144 depends in part on whether the housing cap 1148 is intended to be removable and how often it is intended to be removed. Further, the interface between the housing 1144 and the housing cap 1148 may be weather resistant.

A switch 1152 is attached to the side of the housing 1144 of the fluid flow direction detection device 1100 of FIG. 11. The switch 1152 allows a user of the fluid flow direction detection device 1100 to selectively activate the fluid flow direction detection device 1100. The user interface of the switch 1152 may be any on-off mechanical linkage (e.g. a toggle, rocker, push-button). Transitioning the switch 1152 to an "on" position may activate one or more of the temperature variation source 1104, temperature sensors 1108, and indicators 1136. Further, transitioning the switch 1152 to an "on" may activate part or all of the detector circuitry within the housing 1144. In another implementation, there may be more than one switch 1152 for activating different components of the fluid flow direction detection device 1100. In yet another implementation, the switch 1152 may have more than two positions (e.g. "on" and "off"). The switch 1152 may also be weather resistant.

The fluid flow direction detection device 1100 of FIG. 11 is also equipped with four pedestals 1156 supporting the protective cover 1132. The protective cover 1132 is adapted to allow fluid to flow relatively unimpeded in a direction parallel to the mounting board 1140 and to largely prevent fluid flow in directions that are not parallel to the mounting board 1140. Further, the protective cover 1132 protects the fluid flow direction detection device 1100 components that are mounted on the top side of the mounting board 1140 (e.g. the temperature variation source 1104, temperature sensors 1108, and indicators 1136) which may be susceptible to damage caused by physical contact.

In the implementation of FIG. 11, the protective cover 1132 is round, covers the entire mounting board 1140, and is transparent allowing the indicators 1136 to be visible to the user through the protective cover 1132. In other implementations, the protective cover 1132 may be a different shape and partially or totally opaque so long as the indicators 1136 are visible to the user and the components that are mounted on the top side of the mounting board 1140 are adequately protected. As such, the protective cover 1132 may be constructed of polycarbonate or any other rigid or semi-rigid material (e.g. metal, other plastics, wood, and rubber). In an implementation where the components that are mounted on the top side of the mounting board 1140 are particularly robust, the protective cover 1132 may be omitted.

Figure 12:
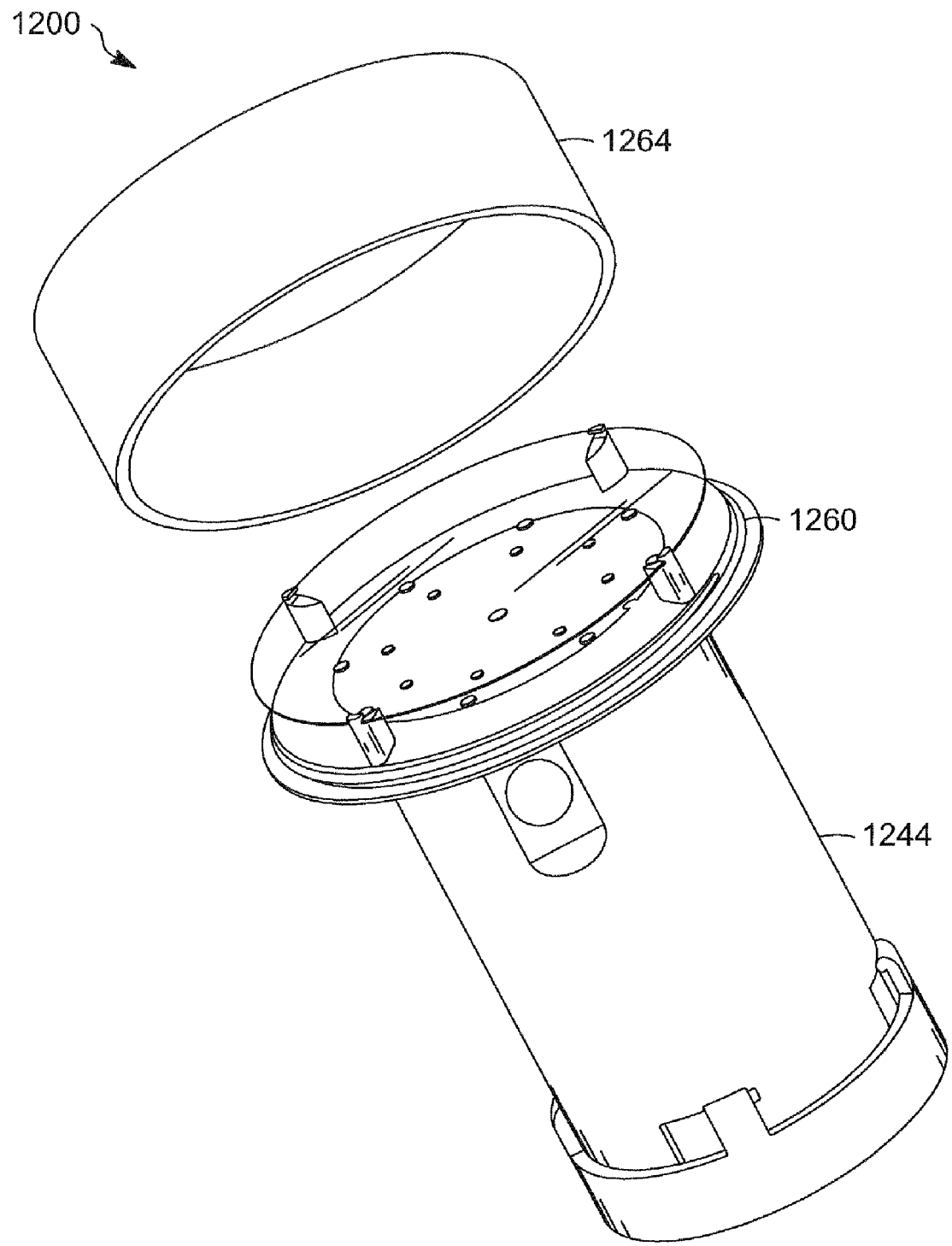
FIG. 12 illustrates a perspective view of an example fluid flow direction detection device with a protective cap.

FIG. 12 illustrates a perspective view of an example fluid flow direction detection device 1200 with a protective cap 1264. The protective cap 1264 provides additional protection to the components mounted on the top side of the mounting board when the example fluid flow direction detection device 1200 is not in use. The protective cap 1264 interfaces with the housing 1244 to provide a sealed compartment for the temperature variation source, temperature sensors, indicators, pedestals, and protective cover. The cap interface 1260 between the protective cap 1264 and the housing 1244 utilizes threads for screwing the protective cap 1264 on to the housing 1244 as shown in FIG. 12. Alternatively, ridges and/or grooves for snapping the protective cap 1264 on to the housing 1244 or any other selective attachment may be used. In another implementation, a cam-action lock may be used to secure the protective cap 1264 to the housing 1244. The protective cap 1264 may be constructed of any rigid or semi-rigid material (e.g. metal, plastic, wood, and rubber) and may be transparent or opaque. Further, the interface between the housing 1244 and the protective cap 1264 may be weather resistant.

Figure 13:
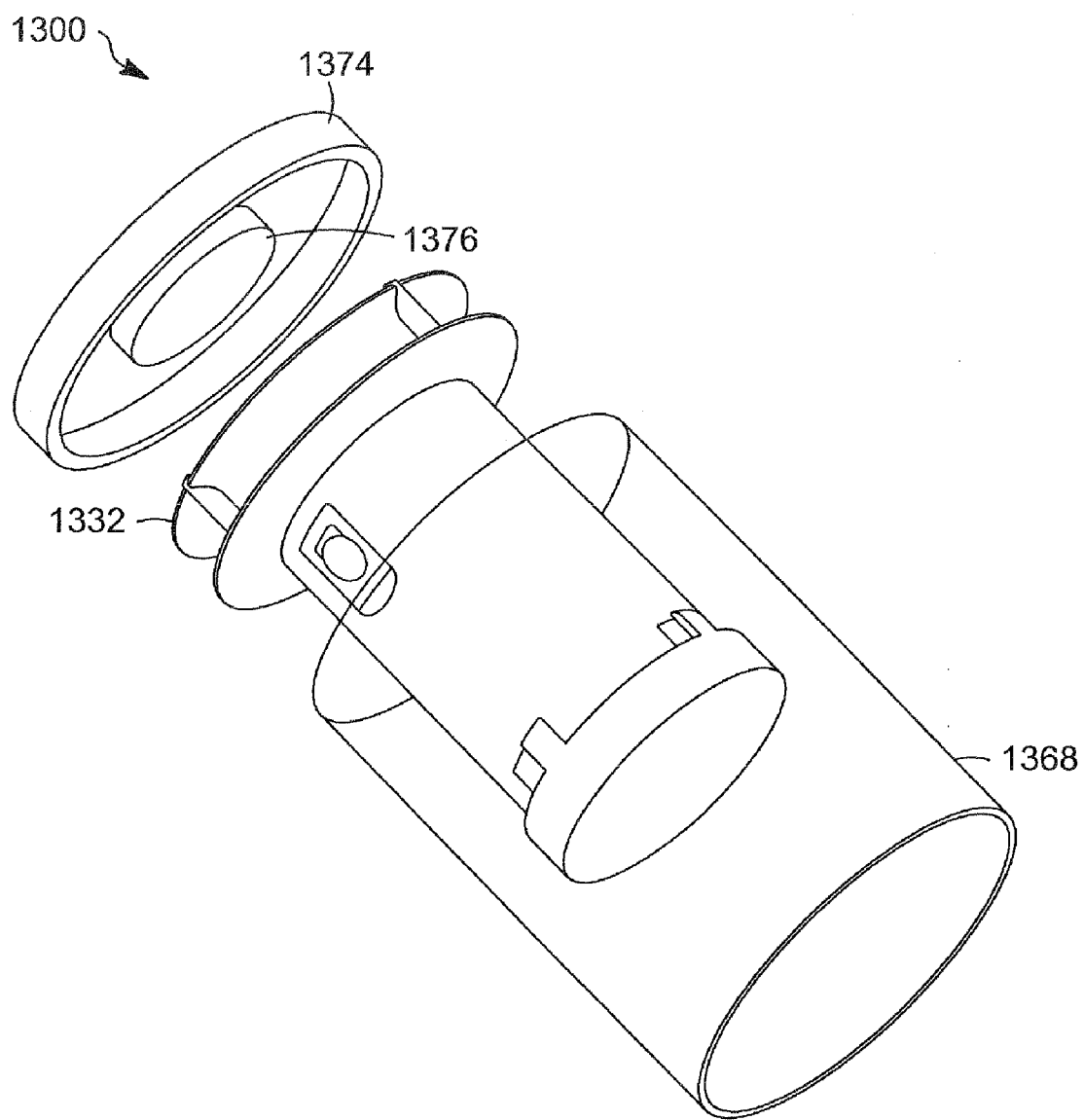
FIG. 13 illustrates a perspective view of an example fluid flow direction detection device inside a protective container.

FIG. 13 illustrates a perspective view of an example fluid flow direction detection device 1300 inside a protective container 1368. The protective container 1368 protects the fluid flow direction detection device 1300 as a whole, including the components that are mounted on the top side of the mounting board, when the example fluid flow direction detection device 1300 is not in use. While the protective container 1368 shown in FIG. 13 is cylindrical with an opening on one end, the protective container 1368 may be configured in any shape that can encompass the fluid flow direction detection device 1300 with an opening through which the fluid flow direction detection device 1300 may be placed and removed.

The open end of the protective container 1368 is adapted to interface with a lid 1374. The interface between the protective container 1368 and the lid 1374 may be any selective attachment method (e.g. threads for screwing the lid 1374 on the protective container 1368 or ridges and/or grooves for snapping the lid 1374 on the protective container 1368). In another implementation, a cam-action lock maybe used to secure the lid 1374 to the protective container 1368. The protective container 1368 and lid 1374 may be constructed of any rigid or semi-rigid material (e.g. metal, plastic, wood, and rubber) and may be transparent or opaque. Further, the interface between the protective container 1368 and the lid 1374 may be weather resistant.

The lid 1374 of FIG. 13 is equipped with a cushion 1376. The cushion 1376 is adapted to compress against the protective cover 1332 of the fluid flow direction detection device 1300 within the protective container 1368, when the lid 1374 is attached to the protective container 1368. This secures the fluid flow direction detection device 1300 within the protective container 1368 and prevents the fluid flow direction detection device 1300 from damage caused by impact with the protective container 1368 interior walls when the protective container 1368 is abruptly moved. In an alternative implementation, the cushion 1376 may be placed on the interior surfaces of the protective container 1368 and cushion impact with the protective container 1368 interior walls rather than prevent it. The cushion 1376 may be any semi-rigid or non-rigid material that may be adapted to secure or cushion the fluid flow direction detection device 1300 (e.g. rubber, foam, paper, felt, down, or cotton).

Figure 14:
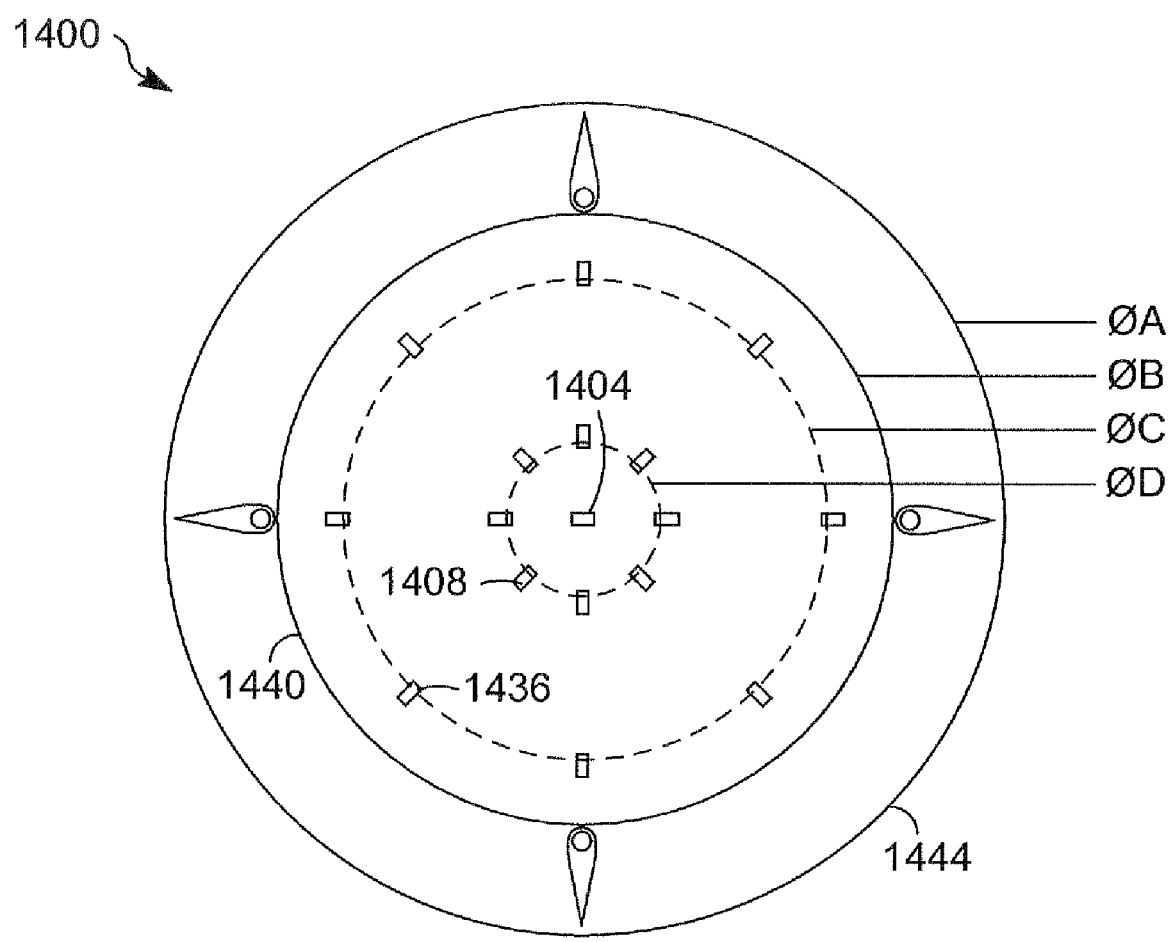
FIG. 14 illustrates a plan view of a first side of a mounting board of an example fluid flow direction detection device.

FIG. 14 illustrates a plan view of a first side of a mounting board 640 of an example fluid flow direction detection device 1400. As discussed above with reference to FIG. 3, a temperature variation source 1404, temperature sensors 1408, and indicators 1436 are positioned on a top side of the mounting board 1440. The configuration of the temperature variation source 1404 and temperature sensors 1408 are discussed above with reference to FIG. 1. In the implementation of FIG. 14, the mounting board 1440 is a circuit board. More specifically, the mounting board 1440 of FIG. 14 is a 0.0625" FR-4 printed circuit board with two to four one ounce copper layers. However, the mounting board 1440 may be any structure that serves as a base for the temperature variation source

1404, temperature sensors 1408, indicators 1436, detector circuitry, and other components of the fluid flow direction detection device 1400.

In the implementation of FIG. 14, the indicators 1436 are positioned on the mounting board 1440 radially outward from and corresponding to each temperature sensor 1408. However, any configuration of indicators 1436 may be used so long as the indicators 1436 present a visual indication of fluid flow direction (e.g. an arrow or other pointer). Further, while the indicators 1436 of FIG. 14 are light emitting diodes (LEDs), other types of lights may be used (e.g. incandescent, neon, and high-intensity discharge). In the implementation of FIG. 14, the LED display is inverted such that the LED opposite of the thermal variation plume illuminates, showing the direction from which the fluid flow is coming (upstream fluid direction). In other implementations, the LED display may indicate the downstream fluid flow direction.

In the implementation of FIG. 14, the temperature variation source 1404 is mounted in the center of a circular arrangement of temperature sensors 1408 and indicators 1436 on a circular mounting board 1440 mounted on a circular top of the housing 1444. In this implementation, the diameter of the arrangement of temperature sensors 1408 (ØD) is 1.0 inch. In other implementations this diameter may vary, but as the test results discussed above show, when ØD approaches 0.5 inches, the accuracy of the example fluid flow direction detection device is significantly reduced. Further, if ØD is too large, the temperature variation plume from the temperature variation source 1404 may not reach the temperature sensors 1408 before dissipating into the fluid flow.

Further, the diameter of the circular mounting board 1440 (ØB) in this implementation is 1.5 inches. In other implementations, ØB may vary from a minimum of the greater of the diameter of the arrangement of indicators 1436 (ØC) and the diameter of the arrangement of temperature sensors 1408 (ØD) to a maximum limited only by the portability and cost of the example fluid flow direction detection device 1400.

The diameter of the arrangement of indicators 1436 (ØC) of the implementation shown may vary from a minimum of ØD (1.0 inch) to ØB (1.5 inches). In other implementations, there are no limitations on ØC so long as the indicators 1436 accurately convey the fluid flow direction to the user of the example fluid flow direction detection device 1400.

The diameter of the circular top of the housing 1444 (ØA) in the implementation shown in FIG. 14 is 2.3 inches. In other implementations, ØA may vary from a minimum of ØB to a maximum limited only by the portability and cost of the example fluid flow direction detection device 1400.

Figure 15:
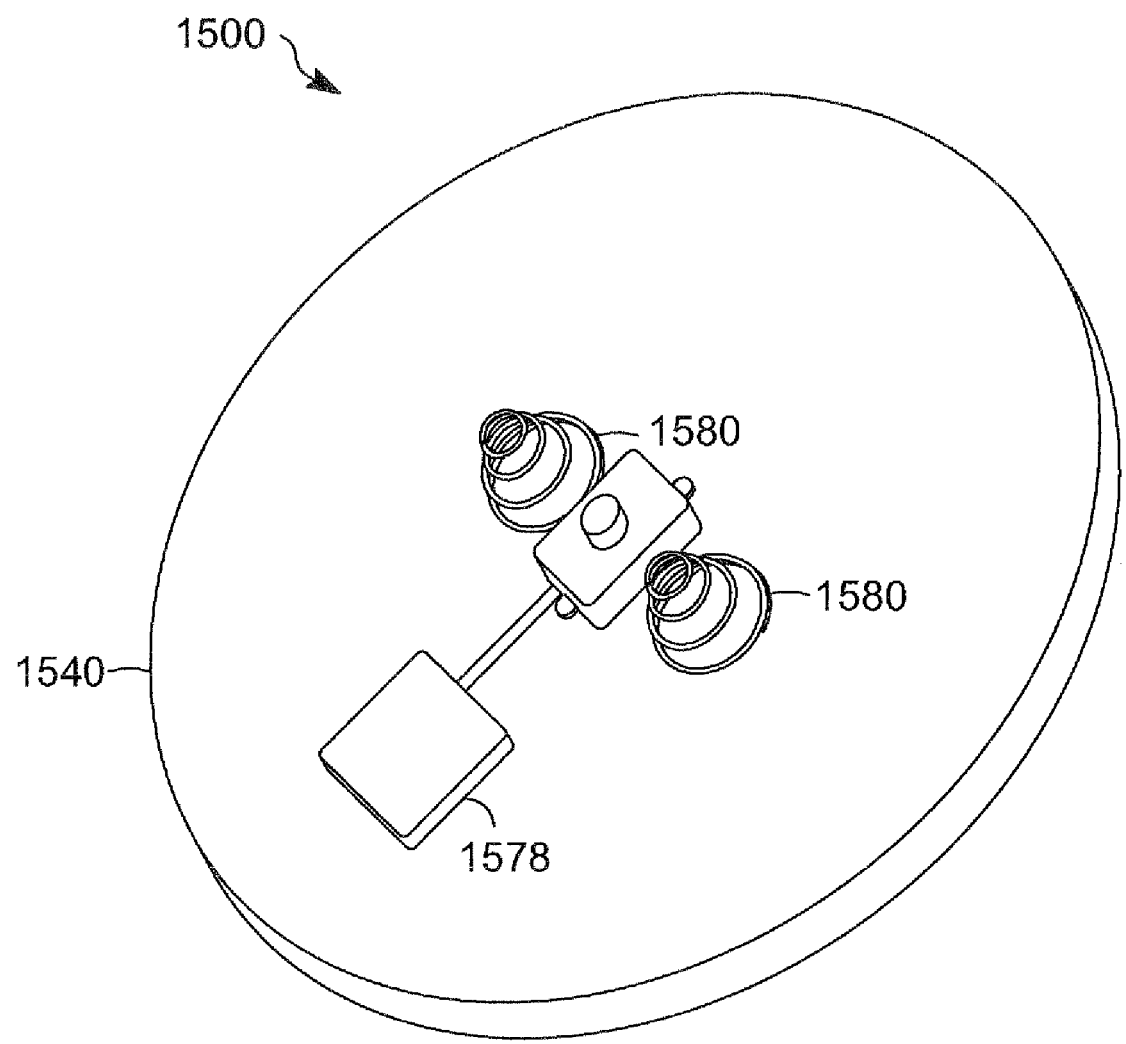
FIG. 15 illustrates a perspective view of a second side of a mounting board of an example fluid flow direction detection device.

FIG. 15 illustrates a perspective view of a second side of the mounting board 1540 of the example fluid flow direction detection device 1500. In the implementation shown in FIG. 15, a detector circuit 1578 and battery contacts 1580 are attached to the second side of the mounting board 1540. More specifically, the detector circuit 1578 of FIG. 15 is a Texas Instruments® MSP430F2123 microprocessor, however other microprocessors are contemplated. In other implementations, batteries and/or a detector circuit 1578 may not be used and other components may be mounted on the second side of the mounting board 1540. In the implementation of FIG. 15, the detector circuit 1578 is used to coordinate and control a temperature variation source, temperature sensors, and indicators. Further, the detector circuit 1578, temperature variation source, temperature sensors, and indicators are powered by one or more batteries compressively electrically connected to the battery contact(s) 1580. The mounting board 1540 contains electrical connections between the battery contact(s) 1580, detector circuit 1578, temperature variation source, temperature sensors, and indicators.

Figure 16:
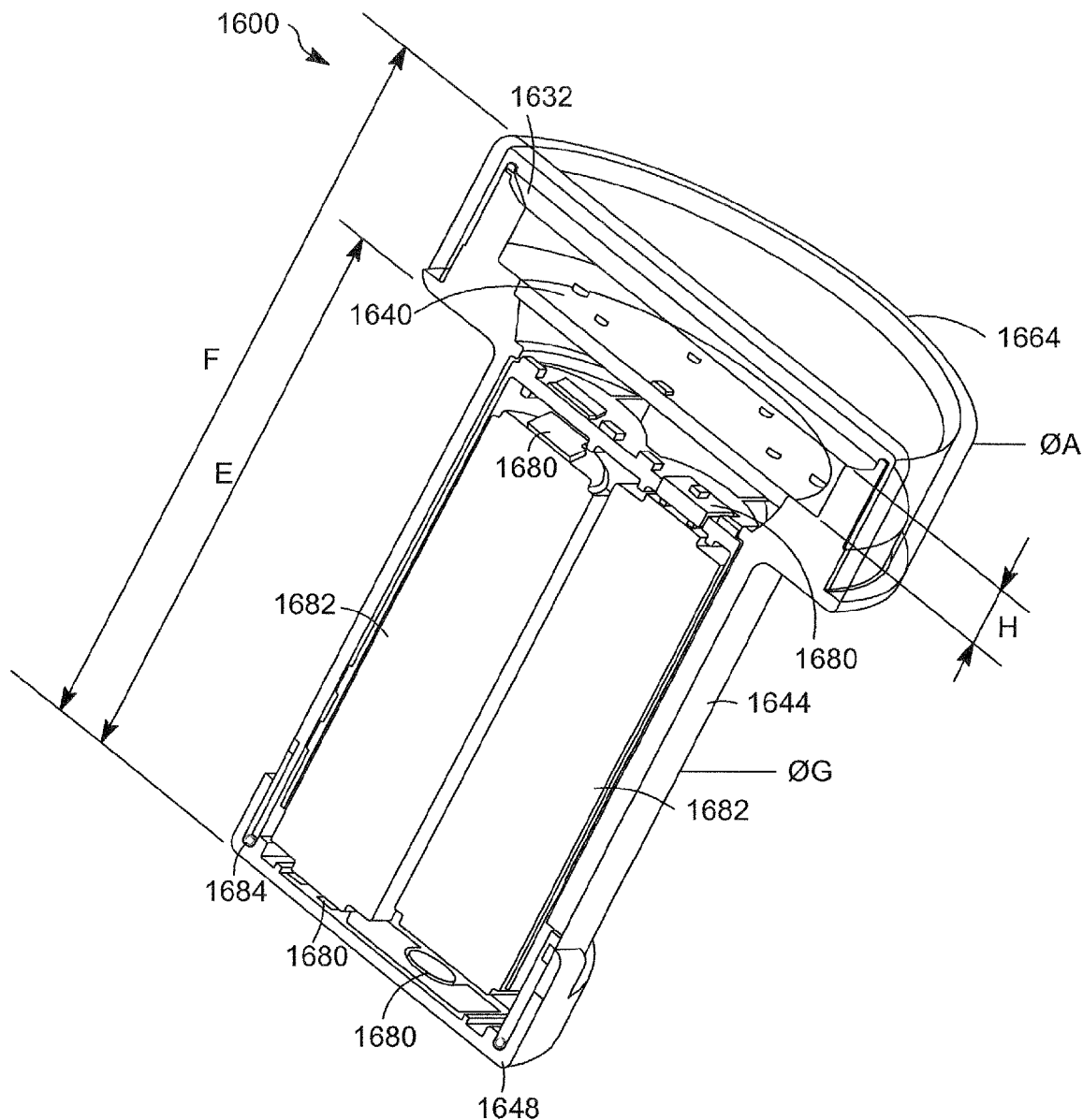
FIG. 16 illustrates a cross section of another example fluid flow direction detection device with a protective cap.

FIG. 16 illustrates a cross section of another example fluid flow direction detection device 1600 with a protective cap 1664. Two cylindrical AA batteries 1682 are shown within the housing 1644 of the fluid flow direction detection device 1600. The batteries 1682 may be disposable or rechargeable. Other sizes of batteries 1682 (e.g. AAA, AAAA, 9V, coin cell) may be used for the fluid flow direction detection device 1600. Further, the batteries may utilize various types of cells (e.g. Alkaline, Lithium, Lithium-ion, Nickel-Cadmium, and Nickel-metal hydride).

The battery life of the example fluid flow direction detection device 1600 has been calculated based on estimated operating conditions. First, it is assumed that the example fluid flow direction detection device 1600 is stored at an ambient temperature of −4 degrees Fahrenheit to 104 degrees Fahrenheit, draws 100 milliamperes during operation, draws 1 microampere during storage, and utilizes two AA Alkaline batteries (2250 milliampere-hours each). Further, it is assumed that the example fluid flow direction detection device 1600 is operated for a set of twice for 15 seconds at a time, used for four sets separated by two hours per day, and used for ten days per year. Using this data, the duty cycle is calculated: 15 seconds×2×4×10=1200 seconds/31536000 seconds=0.038%. Average current: 100 milliamperes× 0.00038=38 microamperes.

Therefore, the estimated battery life for AA Alkaline batteries would be approximately ten years—beyond the expected shelf life of the batteries. Further, the estimated battery life if the example fluid flow direction detection device 1600 utilizes AAA Alkaline batteries is approximately five years—again longer than the expected shelf life of the batteries. Further, a single Lithium coin cell may be used that would last approximately one year.

The batteries 1682 are compressively electrically connected to the battery contacts 1680 that provide electrical power to components of the fluid flow direction detection device 1600 (e.g. the detector circuit, temperature variation source, temperature sensors, and indicators). The battery contacts 1680 may be metal springs, tabs, and/or seats. Further, the implementation of FIG. 16 utilizes an o-ring 1684 in the interface between the housing 1644 and the housing cap 1648 to seal the interior of the housing 1644.

As discussed above with respect to FIG. 6, the diameter of the circular top of the housing 1644 (ØA) is 2.3 inches. Further, in the implementation of FIG. 16, the diameter of the body of the housing 1644 (ØG) is 1.3 inches and the length of the body of the housing 1644 (E) is 2.2 inches. In other implementations, dimensions ØG and E are only limited by the ability of the housing 1644 to encompass the batteries 1682 and any other hardware.

The overall length of the example fluid flow direction detection device 1600 (F) is 3.0 inches, however, this length may vary from a minimum required to encompass all of the hardware of the example fluid flow direction detection device 1600 and a maximum limited by the portability and cost of the example fluid flow direction detection device 1600. Additionally, the distance between the mounting board 1640 and the protective cover 1632 (H) is 0.4 inches, however, H may vary depending on the desired size of the example fluid flow direction detection device 1600 overall.

Figure 17:
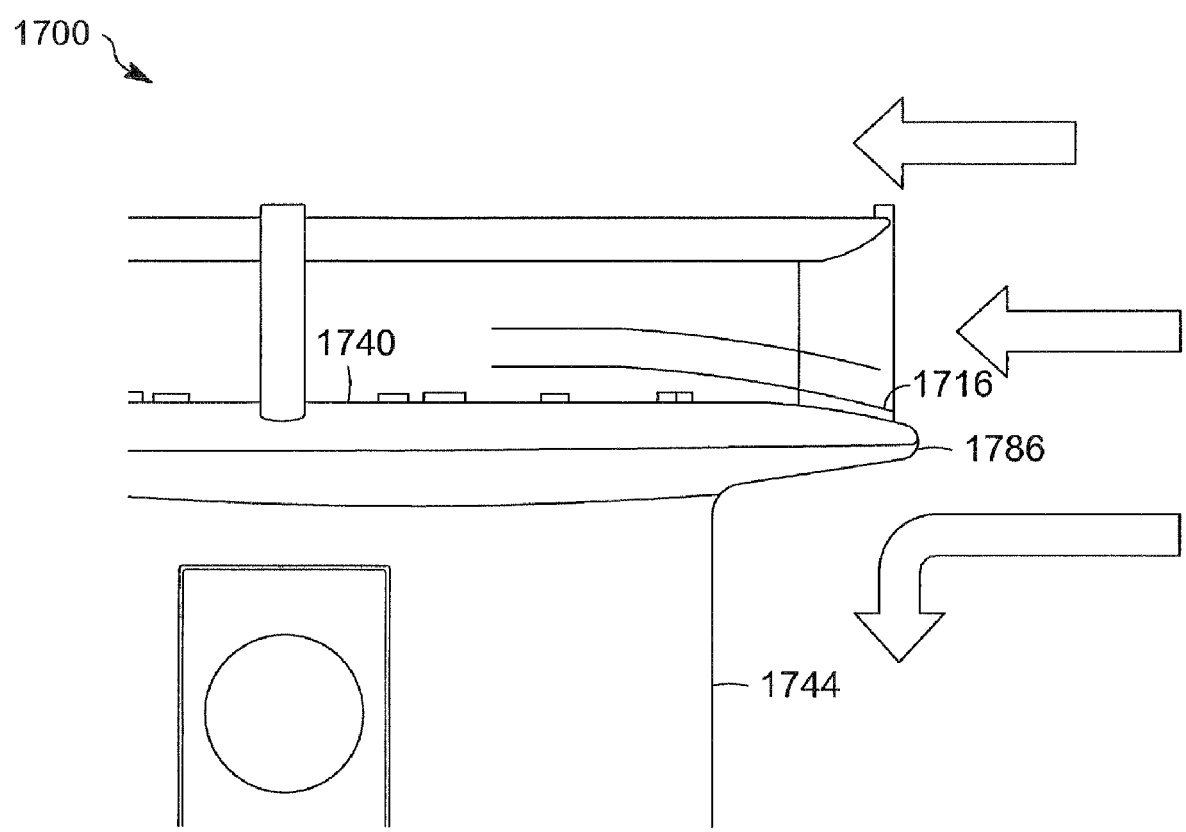
FIG. 17 illustrates a detail side view of another example fluid flow direction detection device.

FIG. 17 illustrates a detail side view of another example fluid flow direction detection device 1700. The fluid flow direction detection device 1700 according to the implementation shown in FIG. 17 utilizes a relatively smooth lip 1786 on the circular top of the housing 1744. The relatively smooth lip 1786 allows the fluid flow 1716 to continue over the mounting board 1740 smoothly and relatively unimpeded, resulting in greater accuracy of the example fluid flow direction detection device 1700.

Figure 18:
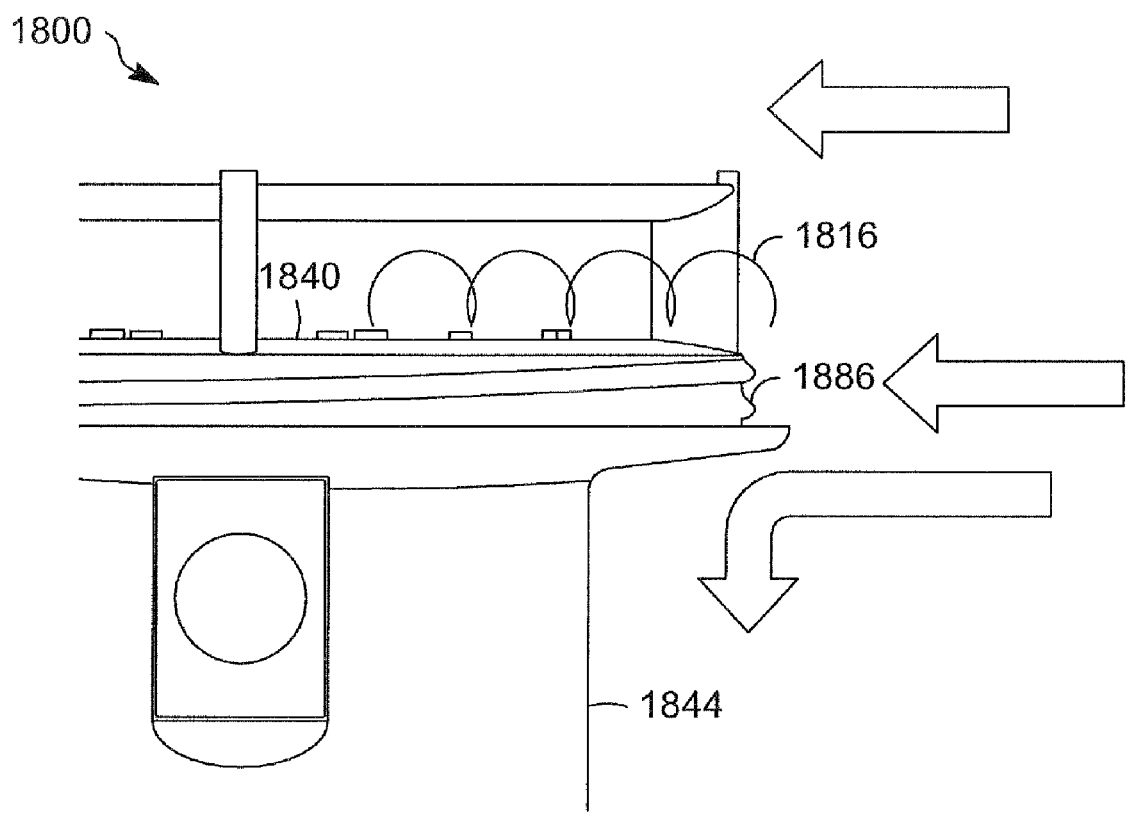
FIG. 18 illustrates a detail side view of another example fluid flow direction detection device adapted for a screw-on protective cap.

FIG. 18 illustrates a detail side view of another example fluid flow direction detection device 1800 adapted for a screw-on protective cap. The fluid flow direction detection device 1800 according to the implementation shown in FIG. 18 utilizes a more abruptly shaped lip 1886 on the circular top of the housing 1844. The more abruptly shaped lip 1886 disturbs the fluid flow 1816 flowing over the mounting board 1840 and results in decreased accuracy of the example fluid flow direction detection device 1800. Additional variations of the lip 1786, 1886 are contemplated that balance the need to attach a protective cap with the desire for an accurate fluid flow direction detection device 1700, 1800.

Figure 19:
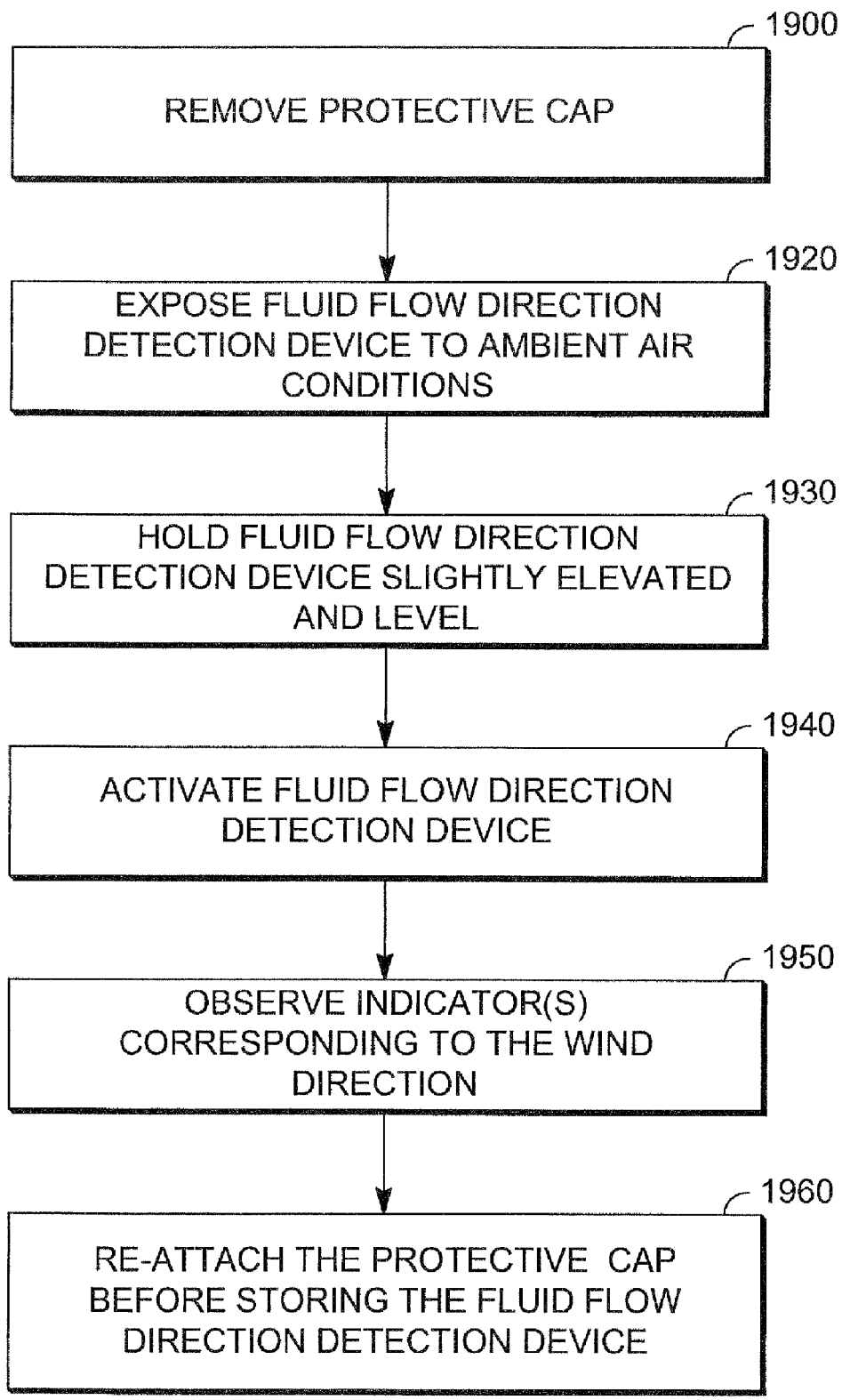
FIG. 19 is a flow chart illustrating an example process for operating a fluid flow direction detection device to measure a wind direction.

FIG. 19 is a flow chart illustrating an example process for operating a fluid flow direction detection device to measure a wind direction. First, a user removes the protective cap (if equipped) 1910 from the fluid flow direction detection device. Then the user exposes the fluid flow direction detection device to ambient air conditions 1920 for at least one minute to ensure that the temperature of the fluid flow direction detection device is even and equal to the ambient temperature. This step may take longer than one minute if the ambient temperature is considerably higher or lower (e.g. 50 degrees Fahrenheit) than the storage temperature of the fluid flow direction detection device.

Once the temperature of the fluid flow direction detection device has equalized with the ambient temperature, the user holds the fluid flow direction detection device slightly elevated, making sure that the mounting board is oriented parallel to the wind flow (in most cases, level with the ground) 1930. The user must be able to see the indicators on the fluid flow direction detection device.

Next, the user activates the fluid flow direction detection device 1940 by activating the switch. The indicators will all flash twice to signify that they are working. Then the indicators flash in sequence to signify that the fluid flow direction detection device is detecting the wind direction. In the implementation disclosed herein, detection of the wind direction takes from 7 seconds to 14 seconds depending on the specific configuration of the fluid flow direction detection device. However, different wind direction detection times are possible and contemplated herein. Further, operation 1940 is merely an example implementation of fluid flow direction detection device logic. A variety of additional implementations of the fluid flow direction detection device logic are also contemplated.

Once the fluid flow direction detection device has determined the wind direction, the user will observe the corresponding illuminated indicator(s) 1950. As discussed above, the illuminated indicator(s) may signify either the upstream or downstream wind direction. Illumination of two indicators signifies that the measured wind direction lies between the two indicators. The indicator(s) will de-illuminate after 12 seconds to preserve battery life. The fluid flow direction detection device may be equipped with a deep sleep mode in addition to on and off modes to conserve power. Once the user is finished using the fluid flow direction detection device, the user replaces the protective cap (if equipped) 1960 before storing the fluid flow direction detection device.

The above specification and examples provide a complete description of the structures of example implementations of methods and apparatus that may be used for providing and using a fluid flow direction detection device. Although various implementations of the methods and apparatus have been described above with a certain degree of particularity, or with reference to one or more individual implementations, those skilled in the art could make numerous alterations to the disclosed implementations without departing from the spirit or scope of the presently disclosed technology. It is intended that all matter contained in the above description and shown in the accompanying drawings shall be interpreted as illustrative only of particular implementations and not limiting. Changes in detail or structure may be made without departing from the basic elements of the presently disclosed technology as defined in the following claims.

What is claimed:

1. A device for detecting a direction of fluid flow, the device comprising:
   a temperature variation source configured on the device to alter thermal energy within a fluid near the temperature variation source;
   one or more temperature sensors positioned on the device relative to the temperature variation source and detecting temperature of the fluid;
   detector circuitry on the device that determines the direction of the fluid flowing across the one or more temperature sensors based on the temperature of the fluid detected by the one or more temperature sensors; and
   one or more indicators mounted on the device and coupled to the detector circuitry, the one or more indicators indicating the direction of fluid flow based on the detector circuitry determination.

2. The device of claim 1, wherein the detector circuitry determines the direction of the fluid flowing across the one or more temperature sensors based on a temperature sensor showing a temporal change in temperature.

3. The device of claim 1, wherein the detector circuitry determines the direction of the fluid flowing across two or more of the temperature sensors based on a temperature sensor showing a temperature differential between the two or more temperature sensors.

4. The device of claim 1, further comprising:
   a cover positioned over the one or more temperature sensors and configured to allow the fluid to flow between the cover and the one or more temperature sensors.

5. The device of claim 1, further comprising:
   a weather resistant housing configured to protect one or more of the temperature variation source, the one or more temperature sensors, the detector circuit, and the indicator.

6. The device of claim 1, wherein the one or more indicators comprise light emitting diodes that illuminate to indicate the direction of fluid flow.

7. The device of claim 1, wherein the one or more indicators comprise one or more lights corresponding to each of the one or more temperature sensors.

8. The device of claim 1, wherein the fluid is a gas.

9. The device of claim 1, wherein the fluid is a liquid.

10. The device of claim 1, wherein the fluid is a plasma.

11. The device of claim 1, wherein the temperature variation source is located interior to a perimeter formed by three or more of the temperature sensors.

12. The device of claim 1, wherein the temperature variation source is a heat generating electric resistance device.

13. The device of claim 1, wherein each of the one or more temperature sensors are positioned between 0.25 inches and 0.75 inches from the temperature variation source.

14. The device of claim 1, further comprising:
- a cylindrical housing configured to encompass one or more batteries that power the temperature variation source, the one or more temperature sensors, and the one or more indicators;
- a circular mounting board with a first face affixed to one end of the cylindrical housing, wherein the detector circuitry is mounted on the first face of the circular mounting board and the temperature variation source, the one or more temperature sensors, and the one or more indicators are mounted on a second face of the circular mounting board; and
- a cover positioned over the second face of the circular mounting board and configured to allow the fluid to flow between the cover and the second face of the circular mounting board.

15. The device of claim 1, wherein one or more of the temperature variation source, the one or more temperature sensors, and the one or more indicators protrude from a surface of the device.

16. A method for a detecting a direction of fluid flow, the method comprising:
- altering thermal energy within a fluid by a temperature variation source mounted on a detector device;
- detecting a temperature of the fluid at one or more temperature sensors positioned on the detector device relative to the temperature variation source;
- determining the direction of the fluid flowing across the one or more temperature sensors based on the temperature of the fluid detected by the one or more temperature sensors; and
- indicating on the detector device the direction of fluid flow based on one or more of the temperature sensors corresponding to the direction of fluid flow.

17. The method of claim 16, wherein the determining operation determines the direction of the fluid flowing across the one or more temperature sensors based on a temperature sensor showing a temporal change in temperature.

18. The method of claim 16, wherein the determining operation determines the direction of the fluid flowing across two or more temperature sensors based on a temperature sensor showing a temperature differential between the two or more temperature sensors.

19. The method of claim 16, wherein the indicating operation utilizes one or more light emitting diodes that illuminate to indicate the direction of fluid flow.

20. The method of claim 16, wherein the indicating operation utilizes one or more lights corresponding to each of the one or more temperature sensors.

21. The method of claim 16, wherein the fluid is a gas.

22. The method of claim 16, wherein the fluid is a liquid.

23. The method of claim 16, wherein the fluid is a plasma.

24. The method of claim 16, wherein the temperature variation source is located interior to a perimeter formed by three or more of the temperature sensors.

25. The method of claim 16, wherein the temperature variation source is a heat generating electric resistance device.

26. The method of claim 16, wherein each of the one or more temperature sensors are positioned between 0.25 inches and 0.75 inches from the temperature variation source.

27. The method of claim 16, wherein a duration of the detecting operation is between 7 seconds and 14 seconds.

28. The method of claim 16, wherein the determining operation is performed on the detector device.

29. The method of claim 16, wherein one or more of the temperature variation source and the one or more temperature sensors protrude from a surface of the detector device.

30. The method of claim 16, wherein one or more of the light emitting diodes protrude from a surface of the detector device.

* * * * *